United States Patent
Shin

(12) 
(10) Patent No.: US 10,781,628 B2
(45) Date of Patent: Sep. 22, 2020

(54) DOUBLE GLAZING INSULATION SYSTEM

(71) Applicant: Jae Seung Shin, Anyang-si (KR)

(72) Inventor: Jae Seung Shin, Anyang-si (KR)

( * ) Notice: Subject to any disclaimer, the term of this patent is extended or adjusted under 35 U.S.C. 154(b) by 0 days.

(21) Appl. No.: 16/267,131

(22) Filed: Feb. 4, 2019

(65) Prior Publication Data
US 2019/0169923 A1    Jun. 6, 2019

Related U.S. Application Data

(63) Continuation of application No. PCT/KR2017/007019, filed on Jul. 3, 2017.

(30) Foreign Application Priority Data

Aug. 12, 2016   (KR) .................. 10-2016-0102707

(51) Int. Cl.
| | | |
|---|---|---|
| *E06B 3/677* | (2006.01) | |
| *E06B 5/20* | (2006.01) | |
| *E06B 3/67* | (2006.01) | |
| *E06B 3/663* | (2006.01) | |

(52) U.S. Cl.
CPC .......... *E06B 3/677* (2013.01); *E06B 3/66304* (2013.01); *E06B 3/67* (2013.01); *E06B 3/6707* (2013.01); *E06B 3/6715* (2013.01); *E06B 3/6722* (2013.01); *E06B 5/20* (2013.01); *E06B 5/205* (2013.01)

(58) Field of Classification Search
CPC ...... E06B 3/667; E06B 3/6707; E06B 3/6715; E06B 3/66304; E06B 5/205
See application file for complete search history.

(56) References Cited

U.S. PATENT DOCUMENTS 4,147,002 A * 4/1979 Kautz .................. A01G 9/22
52/306
9,151,105 B1    10/2015 Schwalbe

FOREIGN PATENT DOCUMENTS

| DE | 28 50 637 A1 | 5/1979 |
|---|---|---|
| JP | S57-167748 A | 10/1982 |
| JP | H05-086781 A | 4/1993 |
| JP | H06-042274 A | 2/1994 |

(Continued)

OTHER PUBLICATIONS

International Search Report issued in PCT/KR2017/007019; dated Oct. 26, 2017.

(Continued)

*Primary Examiner* — Donald J Loney
(74) *Attorney, Agent, or Firm* — Studebaker & Brackett PC

(57) ABSTRACT

A double glazing insulation system of the present invention is characterized by including: double glazing having a chamber formed between a pair of glass windows, a bead entrance through which air and a plurality of beads enter and exit the chamber, and an air entrance through which air enters the chamber; a storage tank for storing the plurality of beads; a bead flow pipe guiding the plurality of beads such that the beads flow; an air exhaust pipe guiding the flow of air discharged from the storage tank; an air flow pipe guiding the flow of air entering and exiting through the air entrance; and a main blower which sucks air of the chamber through the air flow pipe or through the air exhaust pipe, thereby filling the chamber with the plurality of beads or discharging the same from the chamber.

12 Claims, 11 Drawing Sheets

(56) References Cited

FOREIGN PATENT DOCUMENTS

| | | |
|---|---|---|
| JP | H07-189561 A | 7/1995 |
| JP | 2000-356080 A | 12/2000 |
| JP | 2012-012913 A | 1/2012 |
| KR | 10-2003-0013032 A | 2/2003 |

OTHER PUBLICATIONS

An Office Action mailed by the Japanese Patent Office dated Jan. 28, 2020, which corresponds to Japanese Patent Application No. 2019-528006 and is related to U.S. Appl. No. 16/267,131.
The extended European search report issued by the European Patent Office dated Jul. 22, 2019, which corresponds to European Patent Application No. 17839656.0-1005 and is related to U.S. Appl. No. 16/267,131.
An Office Action mailed by the Russian Patent Office dated Oct. 21, 2019, which corresponds to Russian Patent Application No. 2019106629 and is related to U.S. Appl. No. 16/267,131.

* cited by examiner

DOUBLE GLAZING INSULATION SYSTEM

CROSS-REFERENCE TO RELATED APPLICATIONS

The present application is a continuation of International Patent Application No. PCT/KR2017/007019, filed Jul. 3, 2017, which is based upon and claims the benefit of priority to Korean Patent Application No. 10-2016-0102707 filed on Aug. 12, 2016. The disclosures of the above-listed applications are hereby incorporated by reference herein in their entirety.

BACKGROUND

Embodiments of the inventive concept described herein relate to a double glazing insulation system, and more particularly, relate to a double glazing insulation system in which a plurality of beads are filled in a chamber between a pair of glass to insulate, shade and soundproof the pair of glass, or to discharge the beads contained in the chamber to view through the glass.

In a building, a window separates a natural environment from an indoor environment, serves as a supply path for sunlight and fresh outside air, and is an essential component that allows a person to feel a sense of view and openness.

Recently, the size of a window tends to increase gradually in order to make the appearance of buildings beautiful.

Therefore, it is an important task to minimize heat loss through a window to reduce energy used in a building.

To solve the problems, gas-filled double windows in which a gas having a low thermal conductivity is injected into the inner space of a double window, vacuum glass windows, low emission coated glass, transmittance control glass, multilayer glass, and the like have been developed in the related art. However, since such a glass window generally requires a special manufacturing technique due to the use of special materials, the cost is increased so that it is difficult to use it universally.

In addition, even if the conventional double-glazing window is provided with a heat insulation effect, it is required to additionally install a separate curtain or blind to prevent solar heat.

SUMMARY

Embodiments of the inventive concept provide a double glazing insulation system in which a plurality of beads are filled in a chamber between a pair of glass to improve heat insulation, shade and soundproofing, and additional curtains or blinds are not required to be installed.

According to an aspect of an embodiment, a double glazing insulation system includes a double glazing including a chamber formed between a pair of glass windows, a bead entrance through which a plurality of beads and air enter and exit from the chamber, and an air entrance through which air enters and exits from the chamber; a reservoir for storing the plurality of beads; a bead flow pipe for connecting the reservoir and the bead entrance to guide a flow of the plurality of beads; an air discharge pipe connected to the reservoir to guide a flow of air discharged from the reservoir; an air flow pipe connected to the air entrance to guide a flow of air entering and exiting from the air entrance; a communication pipe for allowing the air flow pipe to communicate with the air discharge pipe; and a main blower provided in the communication pipe to suck air in the chamber through the air flow pipe or through the air discharge pipe to fill the chamber with the plurality of beads or to discharge the plurality of beads from the chamber.

The double glazing insulation system may further includes a branch pipe branched from the air flow pipe to guide a flow of air; a branch pipe valve provided in the branch pipe to open or close the branch pipe; and an auxiliary blower provided in the branch pipe to pressurize and blow air into the chamber through the branch pipe and the air flow pipe.

The double glazing insulation system may further include a bypass pipe for connecting the communication pipe and the air flow pipe to guide a part of air discharged through the communication pipe via the main blower to flow into the air flow pipe; a bypass pipe valve provided in the bypass pipe to open or close the bypass pipe.

The double glazing insulation system may further include a first valve provided in the bead flow pipe to open or close the bead flow pipe; a second valve provided in the air discharge pipe to open or close the air discharge pipe; and a third valve provided in the air flow pipe to open or close the air flow pipe, wherein the first and third valves are opened and the second valve is closed when the plurality of beads are filled in the chamber, and the first and second valves are opened and the third valve is closed when the plurality of beads are discharged from the chamber.

The double glazing insulation system may further include an auxiliary air flow pipe connected to the branch pipe and the bead flow pipe or a lower end of the reservoir to guide the air blown from the auxiliary blower to flow to the bead flow pipe or the lower end of the reservoir; and an auxiliary air flow pipe valve provided in the auxiliary air flow pipe to open or close the auxiliary air flow pipe.

The double glazing insulation system may further include a bead passage member provided in the bead entrance to guide the plurality of beads and air to flow into or out from the chamber without any bottleneck.

The double glazing insulation system may further include a bead blocking member provided in the air entrance and formed with at least one air hole through which the air flows to prevent the plurality of beads from flowing into the air flow pipe.

The double glazing insulation system may further include an auxiliary blocking member provided in the reservoir to prevent the plurality of beads introduced into the reservoir from flowing out to the air discharge pipe.

The double glazing insulation system may further include a reservoir air inlet pipe provided in the reservoir between the auxiliary blocking member and the air discharge pipe to guide a flow of air introduced into the reservoir; and a reservoir air inlet valve provided in the reservoir air inlet pipe to open or close the reservoir air inflow pipe.

The double glazing insulation system may further include a chamber air inlet pipe provided in the double glazing to communicate with the chamber and allow air to flow into the chamber; and a chamber air inlet pipe valve provided in the chamber air inlet pipe to open or close the chamber air inlet pipe.

The double glazing insulation system may further include an antistatic member grounded to the bead flow pipe to prevent static electricity from being generated between the plurality of beads flowing through the bead flow pipe.

The double glazing insulation system may further include a bead supply pipe branched from the bead flow pipe and communicating with an upper region of the chamber to supply the plurality of beads to the chamber; a bead discharge pipe branched from the bead flow pipe and communicating with the bead entrance to discharge the plurality of beads filled in the chamber; a bead supply pipe valve provided in the bead supply pipe to open or close the bead supply pipe; and a bead discharge pipe valve provided in the bead discharge pipe to open or close the bead discharge pipe, wherein, when the plurality of beads are filled in the chamber, the plurality of beads stored in the reservoir are filled into the chamber through the bead flow pipe and the bead supply pipe, and when the plurality of beads are discharged from the chamber, the plurality of beads stored in the chamber are stored in the reservoir through the bead discharge pipe and the bead flow pipe via the bead entrance.

According to the double glazing insulation system of the embodiment, the plurality of beads are filled in the chamber between the pair of glass to improve heat insulation, shade and soundproofing, or the beads contained in the chamber are discharged to view therethrough, so that any additional curtains or blinds are not required to be installed.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

Figure 1:
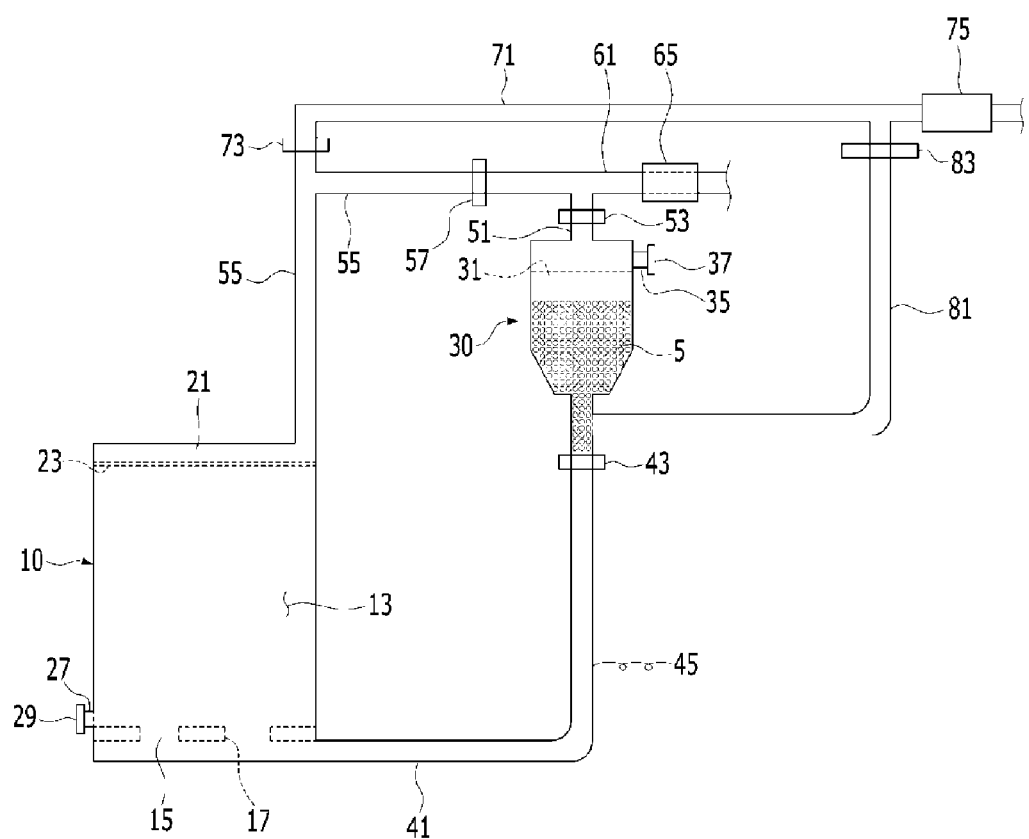
FIG. 1 is a view illustrating a double glazing insulation system according to an embodiment of the inventive concept.

Advantages and features of embodiments of the inventive concept, and method for achieving thereof will be apparent with reference to the accompanying drawings and detailed description that follows. But, it should be understood that the inventive concept is not limited to the following embodiments and may be embodied in different ways, and that the embodiments are given to provide complete disclosure of the inventive concept and to provide thorough understanding of the inventive concept to those skilled in the art.

The terms used in the present disclosure are provided to describe embodiments, not intended to limit the inventive concept. In the present disclosure, singular forms are intended to include plural forms unless the context clearly indicates otherwise. It will be further understood that the terms "comprises," and/or "comprising," used herein, specify the presence of stated elements, but do not preclude the presence or addition of one or more other elements. In the present disclosure, like reference numerals indicate like elements, and the term "and/or" indicates each of listed components or various combinations thereof. Terms, such as "first", "second", etc, are for discriminating various components, but the scope is not limited to the terms. The terms are used for discriminating one component from another component. Therefore, the first component mentioned below may be the second component within the technical spirit of the inventive concept.

Unless otherwise defined, all terms including technical and scientific terms used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, embodiments according to the inventive concept will be described in detail with reference to the accompanying drawings.

FIGS. 1 to 6 illustrate a double glazing insulation system in accordance with an embodiment of the inventive concept.

As shown in these drawings, the double glazing insulation system according to the embodiment of the inventive concept includes a double glazing 10, a reservoir 30, a bead flow pipe 41, an air discharge pipe 51, an air flow pipe 55, a communication pipe 61, and a main blower 65.

The double glazing 10 has a structure in which a pair of glass windows 11 (see FIGS. 7 and 8) are arranged in parallel with each other while being spaced apart from each other by a specified intervals and supported by a window frame (not shown).

An internal space, for example, a chamber 13, is formed between the pair of glass windows 11. The chamber 13 has a filled state in which a plurality of beads 5 are filled therein, or in a discharged state in which the beads 5 are not contained therein. When the beads 5 are filled in the chamber 13, the double glazing 10 has insulating, shading, and soundproofing functions. When the beads 5 are discharged from the chamber 13, it is possible to view through the double glazing 10.

In this case, briefly, the beads 5 are filled with air and gas to have heat insulating property as spherical grains. The bead 5 is preferably made of a foam Styrofoam material having excellent fluidity by blowing air, but the material of the bead 5 is not limited thereto, and other kinds of foam or hydrogel may be used. Preferably, the bead 5 has a white color for blocking sunlight or has a transparent color for transmitting sunlight. In summer, white beads 5 may be used to block the sunlight, thereby obtaining a thermal insulation effect. In winter, white or transparent beads 5 are used to provide a so-called air cap effect, so that it is possible to secure the transparency of the glass, thereby viewing an outside and obtaining a heat insulating effect. Meanwhile, the color of the bead 5 is not limited to the above, and the bead 5 may be produced in various colors. In addition, the shape of the bead 5 may have various cross-sectional shapes such as an ellipse, a polygon, and the like as well as the spherical shape.

Meanwhile, a lower end and an upper end of the double glazing 10 are opened to communicate with the chamber 13, respectively, and both side portions are sealed by a window frame.

The lower end opening of the double glazing 10 forms a bead entrance 15 through which the plurality of beads 5 and the air enter and exit from the chamber 13.

Figure 7:
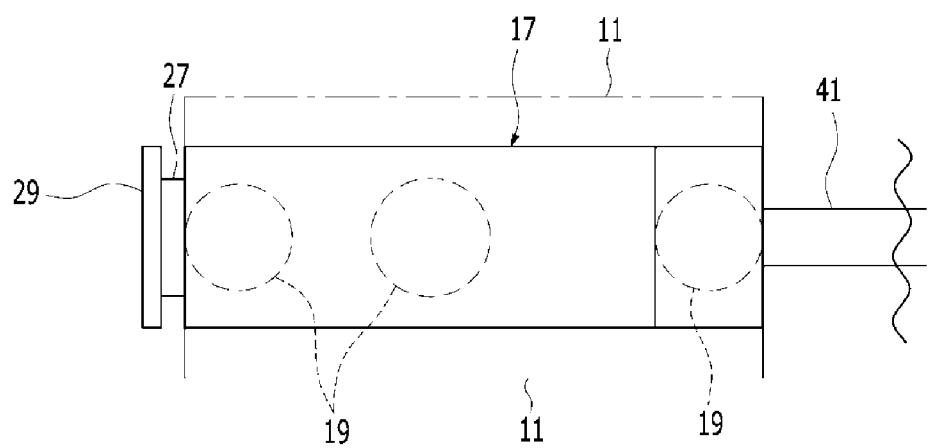
FIG. 7 is a plan view of a bead entrance of the double glazing insulation system of FIG. 1.

A bead passage member 17 is provided in the bead entrance 15. The bead passage member 17 performs a function of guiding the flow of the beads 5 and air such that the beads 5 and air enter and exit from the chamber 13 without any bottleneck. As shown in FIG. 7, the bead passage member 17 has a rectangular plate shape and is coupled to the bead entrance 15 of the double glazing 10. The bead passage member 17 is formed with three circular bead passage holes 19 spaced apart from each other, and each bead passage hole 19 communicates with the chamber 13. The pair of bead passage holes 19 of the three bead passage holes 19 are formed to penetrate toward both sides of the double glazing 10 and the other bead passage hole 19 penetrates through the center of the bead entrance 15. In this case, although the three bead passage holes 19 are shown in the embodiment, the number of the bead passage holes 19 is not limited thereto, and one or more bead passage holes 19 may be formed. In addition, the bead passage hole 19 may have various cross-sectional shapes such as an elliptical shape, a polygonal shape, and the like as well as a circular shape.

An air entrance 21 through which air enters and exits from the chamber 13 is formed in the upper end opening of the double glazing 10.

Figure 8:
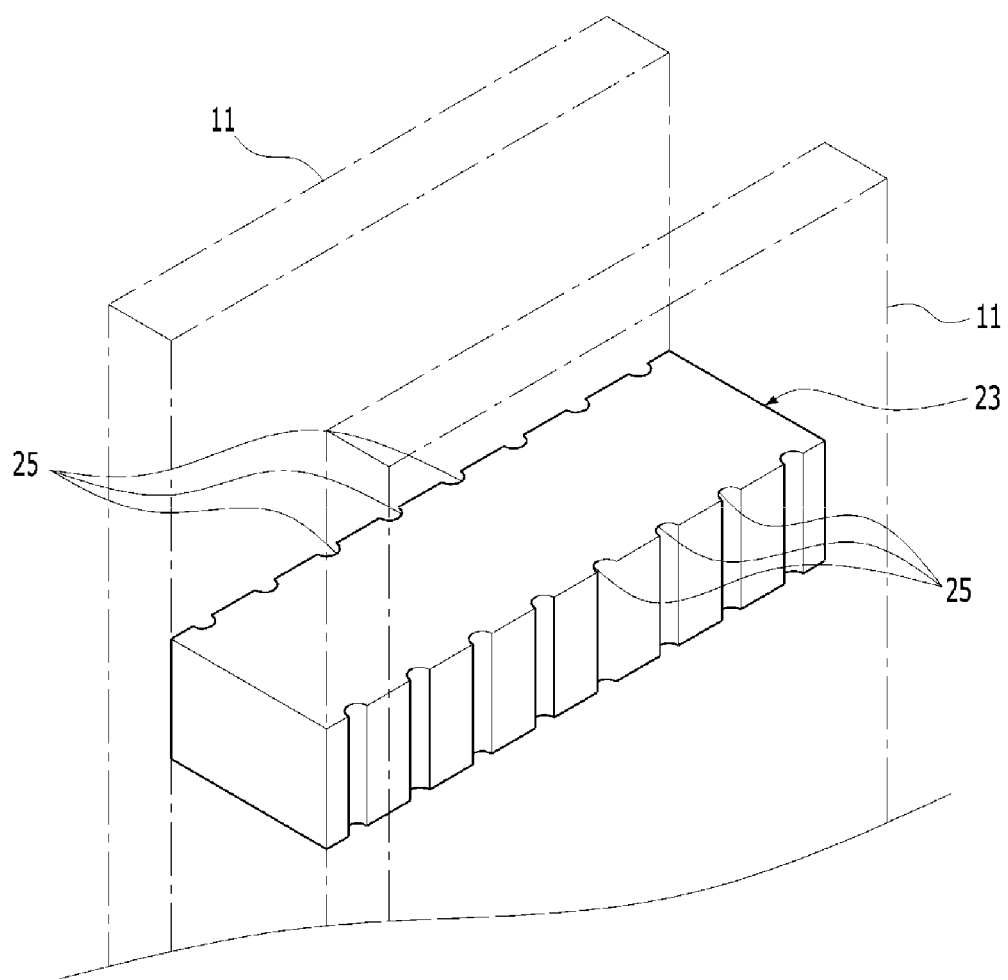
FIG. 8 is a plan view of a main part of a bead blocking member of the double glazing insulation system of FIG. 1.

A bead blocking member 23 is provided in the air entrance 21. As shown in FIG. 8, the bead blocking member 23 has a rectangular plate shape, and is coupled to the air entrance 21 of the double glazing 10. A plurality of air holes 25, which have a semicircular sectional shape having a diameter smaller than that of the bead 5, are formed at both side edges of the bead blocking member 23 which is in close contact with each window surface 11 of the double glazing 10. The plurality of air holes 25 may be formed perpendicularly or obliquely to a flat surface of the bead blocking member 23. Thus, the bead blocking member 23 enables only air to enter or exit from the chamber 13 through the air hole 25 such that the bead 5 is prevented from flowing into the air flow pipe 55. In this case, according to the embodiment, although the plurality of air holes 25 each having a semicircular cross-sectional shape are shown, the embodiment is not limited thereto, and the air hole 25 may be formed on each edge of the bead blocking member 23 or the flat surface in the form of one or more slots along the longitudinal direction of the bead blocking member 23. In addition, the bead blocking member 23 may be formed in a shape of a mesh in which a plurality of through holes having a diameter smaller than that of the bead 5 are formed.

Meanwhile, a chamber air inlet pipe 27 communicating with the chamber 13 is connected to one side portion of the double glazing 10, for example, the window frame between the double glazing 10. The chamber air inlet pipe 27 has a hollow pipe or duct shape. The chamber air inlet pipe 27 performs a function of guiding the flow of air such that external air is introduced into the chamber 13 filled with the beads 5. The chamber air inlet pipe 27 is arranged adjacent to the upper side of the bead passage hole 19 on one side of the bead passage member 17, and arranged to allow the outside air flowing into the chamber air inlet pipe 27 to flow into the chamber 13 while the outside air is perpendicular to the bead passage hole 19. In addition, preferably, the chamber air inlet pipe 27 is located on the side opposite to the bead flow pipe 41 and the air flow pipe 55 while interposing the chamber 13. In addition, a mesh formed with a hole smaller than the bead 5 is provided at an inner portion bounded by the chamber air inlet pipe 27 and the chamber 13 to block the flow of the bead 5.

The chamber air inlet pipe 27 is provided with a chamber air inlet pipe valve 29 for opening and closing the chamber air inlet pipe 27. It is possible to interrupt the flow of air flowing into the chamber 13 along the chamber air inlet pipe 27 by the opening or closing operation of the chamber air inlet pipe valve 29.

As described above, when the plurality of beads 5 are discharged from the chamber 13 of the double glazing 10, external air is supplied to the chamber 13 through the chamber air inlet pipe 27, so that the beads 5 filled in the chamber 13 are smoothly discharged from the chamber 13 without bridging.

In this case, if necessary, the chamber air inlet pipe 27 and the chamber air inlet pipe valve 29 may be optionally provided.

The reservoir 30 has a hollow closed cylindrical shape and stores the beads 5 discharged from the chamber 13 of the double glazing 10.

An auxiliary blocking member 31 is provided in an upper inner region of the reservoir 30. The auxiliary blocking member 31 has a net shape in which a plurality of through holes (not shown) are formed. The plurality of through holes formed in the auxiliary blocking member 31 have a diameter smaller than that of the beads 5 so that the auxiliary blocking member 31 prevents the beads 5 introduced into the reservoir 30 from flowing into the air discharge pipe 51.

In addition, the reservoir 30 is connected to a reservoir air inlet pipe 35. The reservoir air inlet pipe 35 has a hollow pipe or duct shape. The reservoir air inlet pipe 35 is connected to a side wall of the reservoir 30 between the auxiliary blocking member 31 and the air discharge pipe 51 so that external air is guided to be introduced into the reservoir 30. In detail, the beads 5 stored in the reservoir 30 perform a function of guiding the external air to flow over the beads 5.

The reservoir air inlet pipe 35 is provided with a reservoir air inlet pipe valve 37 for opening and closing the reservoir air inlet pipe 35. It is possible to control the flow of the air flowing into the reservoir 30 along the reservoir air inlet pipe 35 by opening and closing the reservoir air inlet pipe valve 37.

Thus, since the external air is introduced above the beads 5 stored in the reservoir 30, when the beads 5 are filled in the chamber 13, the beads 5 stored in the reservoir 30 may be smoothly discharged from the reservoir 30 without bridging.

In this case, if necessary, the reservoir air inlet pipe 35 and the reservoir air inlet pipe valve 37 may be optionally provided.

The bead flow pipe 41 has a hollow pipe or a duct shape and connects the reservoir 30 and the bead entrance 15. The bead flow pipe 41 serves to guide the flow of the beads 5.

The bead flow pipe 41 is provided with a first valve 43 for opening and closing the bead flow pipe 41. The flow of the beads 5 flowing along the bead flow pipe 41 may be interrupted by the opening or closing operation of the first valve 43.

Meanwhile, an antistatic member 45 is grounded on an outer periphery of the bead flow pipe 41. The antistatic member 45 prevents the static electricity generated between the beads 5 flowing in the bead flow pipe 41 and prevents the beads 5 from tangling with each other due to the electrostatic force between the beads 5, so that the occurrence of a bottleneck of the beads 5 in the bead flow pipe 41 may be reduced.

The air discharge pipe 51 has a hollow pipe or duct shape and is connected to one side of the reservoir 30. The air discharge pipe 51 serves to guide the flow of the air discharged from the reservoir 30.

The air discharge pipe 51 is provided with a second valve 53 for opening and closing the air discharge pipe 51. The flow of the air flowing along the air discharge pipe 51 may be interrupted by the opening or closing operation of the second valve 53.

The air flow pipe 55 has a hollow pipe or duct shape. The air flow pipe 55 is connected to the air entrance 21 and serves to guide the flow of air flowing through the air flow pipe 55.

The air flow pipe 55 is provided with a third valve 57 for opening and closing the air flow pipe 55. The flow of air flowing along the air flow pipe 55 may be interrupted by the opening or closing operation of the third valve 57.

The communication pipe 61 is connected to the air flow pipe 55 and the air discharge pipe 51 to communicate with the air flow pipe 55 and the air discharge pipe 51.

The main blower 65 is provided in the communication pipe 61 and sucks air in the chamber 13 through the air flow pipe 55 or sucks air in the chamber 13 through the air discharge pipe 51. In this case, the main blower 65 may be a conventional fan, a blower, an air compressor, a pump, or the like.

Meanwhile, when the main blower 65 sucks the air of the chamber 13 through the air flow pipe 55, the beads 5 stored in the reservoir 30 are filled in the chamber 13. In this case, the first and third valves 43 and 57 are opened, and the second valve 53 is closed.

When the main blower 65 sucks the air of the chamber 13 through the air discharge pipe 51, the beads 5 filled in the chamber 13 are discharged from the chamber 13 and stored in the reservoir 30. In this case, the first and second valves 43 and 53 are opened, and the third valve 57 is closed.

Further, the double glazing insulation system according to an embodiment further includes a branch pipe 71, a branch pipe valve 73, and an auxiliary blower 75.

The branch pipe 71 has a hollow pipe or duct shape. The branch pipe 71 branches off from the air flow pipe 55 and serves to guide the flow of air.

The branch pipe valve 73 is provided in the branch pipe 71 to open and close the branch pipe 71. The flow of air flowing along the branch pipe 71 may be interrupted by the opening or closing operation of the branch pipe valve 73.

The auxiliary blower 75 is provided in the branch pipe 71 and pressurizes and blows air into the chamber 13 through the branch pipe 71 and the air flow pipe 55. The air flowing into the chamber 13 through the branch pipe 71 and the air flow pipe 55 by the auxiliary blower 75 passes through each air holes 25 of the bead blocking member 23, and flows into the chamber 13 along a surface of the glass window 11, so that the residual beads 5 attached to the surface of each glass window 11 by the electrostatic force are removed and the air flows into the bead flow pipe 41 through the bead entrance 15 together with thee residual beads 5.

Thus, it is possible to minimize the amount of beads 5 attached to the surface of the glass window 11 of the double glazing 10 when the beads 5 are discharged from the chamber 13 of the double glazing 10, so that the glass window 11 may be kept clean.

In this case, the auxiliary blower 75 may be a conventional fan, a blower, an air compressor, a pump, or the like.

The double glazing insulation system according to an embodiment further includes an auxiliary air flow pipe 81 and an auxiliary air flow pipe valve 83.

The auxiliary air flow pipe 81 has a hollow pipe or duct shape. The auxiliary air flow pipe 81 is connected to a lower end of the branch pipe 71, the bead flow pipe 41 or the reservoir 30, such that the air blown from the auxiliary blower 75 is guided to flow into the bead flow pipe 41 or a lower end of the reservoir 30. The auxiliary air flow pipe 81 is provided at a portion bounding the bead flow pipe 41 or the lower end of the reservoir 30 with a net formed with holes each smaller than the bead 5 to block the flow of the beads 5.

The auxiliary air flow pipe valve 83 is provided in the auxiliary air flow pipe 81 to open and close the auxiliary air flow pipe 81. It is possible to control the flow of air flowing into the bead flow pipe 41 along the auxiliary air flow pipe 81 by an opening or closing operation of the auxiliary air flow pipe valve 83.

As described above, since the air blown from the auxiliary blower 75 flows into a lower end of the bead flow pipe 41 or the reservoir 30 through the auxiliary air flow pipe 81, when the beads 5 are filled in the chamber 13, the beads 5 may be smoothly moved from the reservoir 30 to the chamber 13 along the bead flow pipe 41 by improving the fluidity of the beads 5 discharged from the reservoir 30.

In this case, if necessary, the auxiliary air flow pipe 81 and the auxiliary air flow pipe valve 83 may be selectively provided. In addition, the ionized air generated from an ion generator, which is not shown, flows in the auxiliary air flow pipe 81, thereby reducing the generation of static electricity between the beads 5 flowing in the bead flow pipe 41.

Meanwhile, it is effective that the bead flow pipe 41, the air discharge pipe 51, the air flow pipe 55, the communication pipe 61, the branch pipe 71, the auxiliary air flow pipe 81, the reservoir air inlet pipe 35, and the chamber air inlet pipe 27 are formed of a conductive material to minimize static electricity. In addition, the first to third valves 43, 53, and 57, the branch pipe valve 73, the auxiliary air flow pipe valve 83, the reservoir air inlet pipe valve 37, the chamber air inlet pipe valve 29 may be implemented with a solenoid valve or a motor operation valve that performs an opening or closing operation by the driving of a motor.

With this configuration, the operation of the double glazing insulation system according to an embodiment will be described with reference to FIGS. 1 to 6 as follows.

First, in a state where the beads 5 are stored in the reservoir 30 and the beads 5 are not filled in the chamber 13 of the double grazing 10 as shown in FIG. 1, a process of filling the beads 5 into the chamber 13 will be described.

The main blower 65 is operated in a state where the first and third valves 43 and 57 are opened and the second valve 53 is closed.

Figure 2:
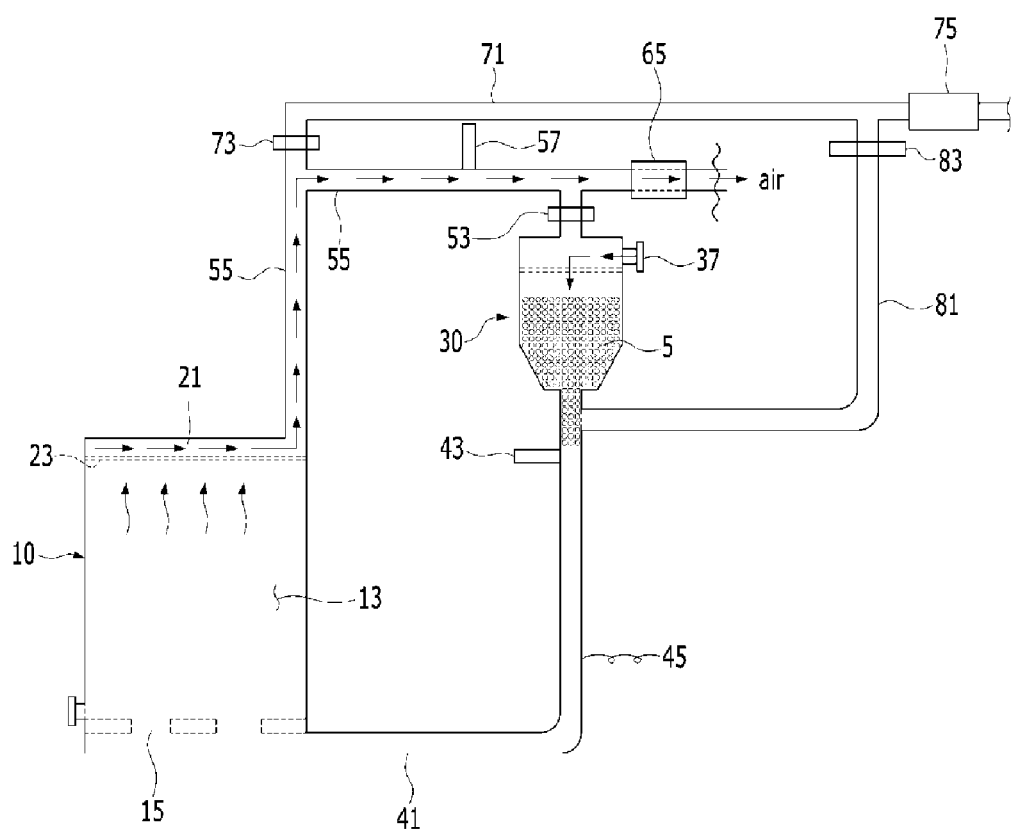
FIGS. 2 and 3 are views illustrating a process of filling a plurality of beads into a double glazing of the double glazing insulation system of FIG. 1.

As shown in FIG. 2, as the main blower 65 is operated, the main blower 65 sucks air existing in the communication pipe 61, the air flow pipe 55, the chamber 13, the bead flow pipe 41. In this case, since the second valve 53 is closed, the air in the reservoir 30 is not sucked by the main blower 65 through the air discharge pipe 51.

A negative pressure is generated in the communication pipe 61, the air flow pipe 55, the chamber 13, and the bead flow pipe 41 by the suction operation of the main blower 65, so that the beads 5 stored in the reservoir 30 flows along the bead flow pipe 41 and flows into the chamber 13 through the bead entrance 15 of the double glazing 10.

Figure 3:
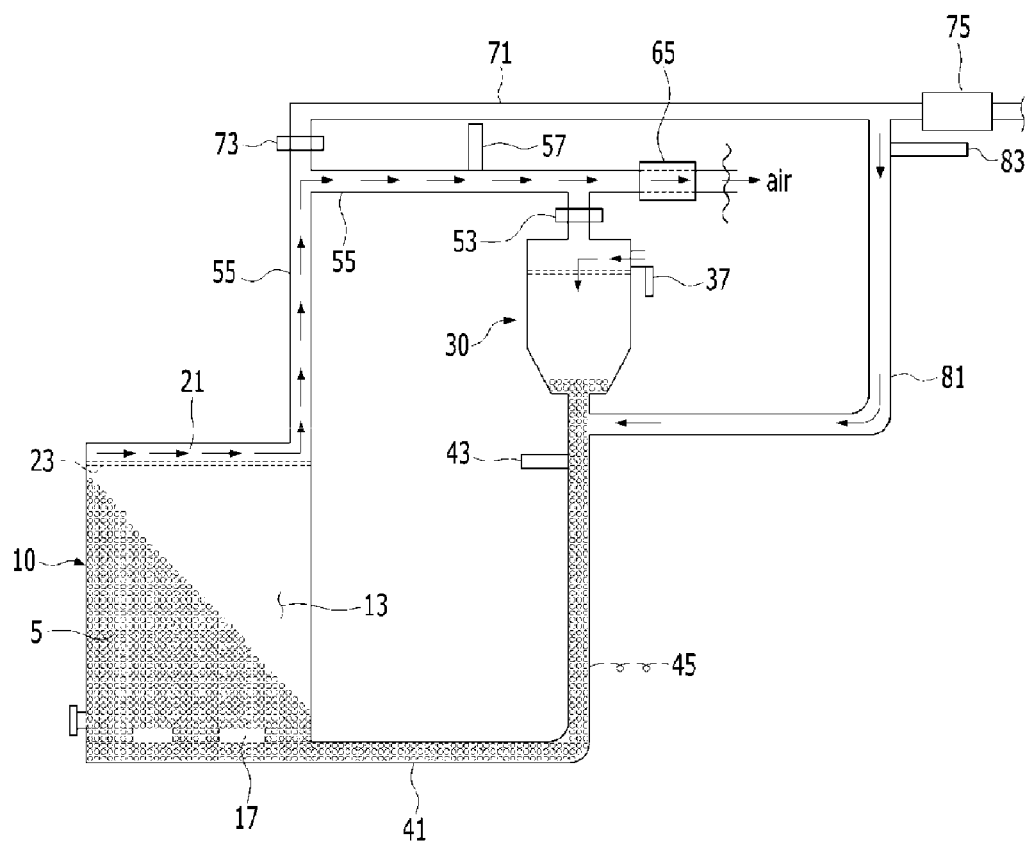

Meanwhile, as shown in FIG. 3, before or during the flowing of the beads 5 into the chamber 13, the reservoir air inlet pipe valve 37 provided in the reservoir air inlet pipe 35 is opened, such that the external air having a relatively higher pressure than the reservoir 30 is provided to the upper side of the beads 5 stored in the reservoir 30, thereby smoothly discharging the beads 5 from the reservoir 30 without bridging. In addition, the auxiliary air flow pipe valve 83 provided in the auxiliary air flow pipe 81 is opened and the auxiliary blower 75 is operated to blow air into the auxiliary air flow pipe 81, so that the air blown by the auxiliary blower 75 flows into the bead flow pipe 41 through the auxiliary air flow pipe 81. Thus, the fluidity of the beads 5 discharged from the reservoir 30 may be improved, so that the beads 5 smoothly flow into the chamber 13 from the reservoir 30 along the bead flow pipe 41. Meanwhile, since the branch pipe valve 73 provided in the branch pipe 71 is closed when the auxiliary blower 75 is operated, the air blown from the auxiliary blower 75 does not flow through the branch pipe 71 into the air flow pipe 55.

As shown in FIG. 3, the beads 5 introduced into the chamber 13 are inclined toward the upper end from the lower end of the double glazing 10 and are filled in the entire region of the chamber 13.

In this case, the beads 5 filled in the chamber 13 are prevented from flowing out to the air flow pipe 55 by the bead blocking member 23 provided in the air entrance 21.

The air introduced into the chamber 13 together with the beads 5 passes through the bead blocking member 23 and is discharged to an outside through the air flow pipe 55 and the main blower 65.

Figure 4:
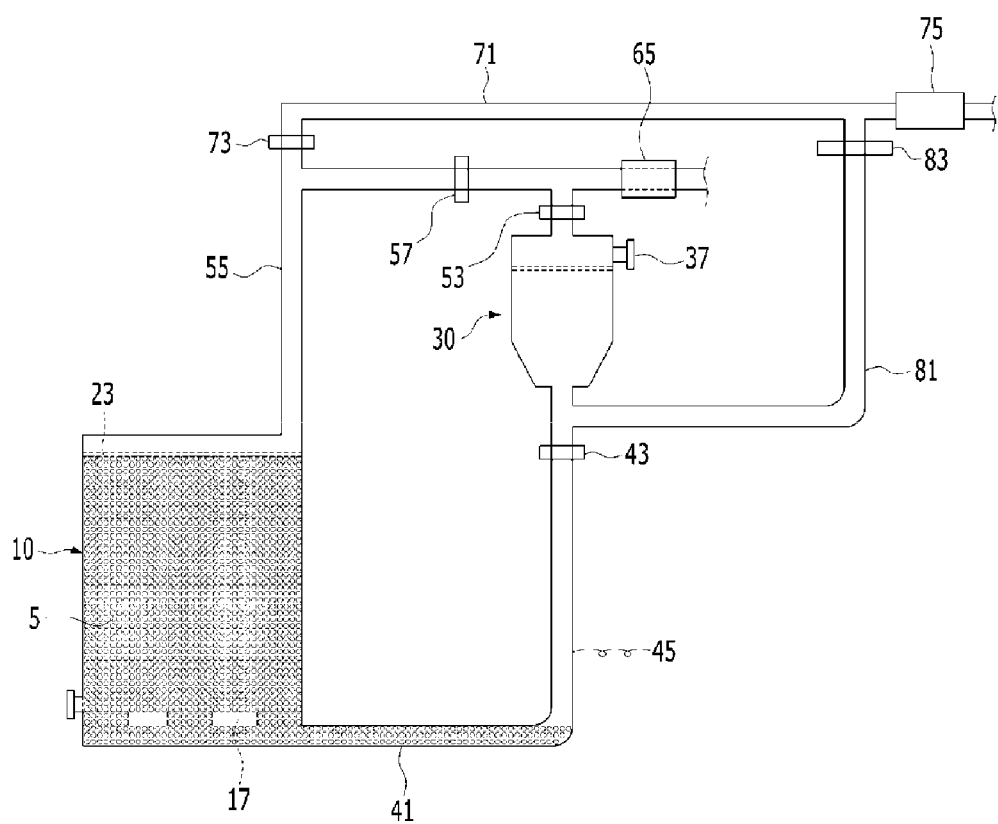
FIG. 4 is a view illustrating a state in which the filling of a plurality of beads into a double glazing of the double glazing insulation system of FIG. 1 is completed.

After the beads 5 stored in the reservoir 30 are filled in the entire region of the chamber 13, as shown in FIG. 4, the first valve 43 and the third valve 57, which were opened, are closed and at the same time, the reservoir air inlet pipe valve 37 and the auxiliary air flow pipe valve 83 are closed.

In addition, by stopping the operation of the main blower 65, the chamber 13 of the double glazing 10 is filled with the beads 5, so that heat insulation, shade and soundproofing are improved due to the double glazing 10 and additional curtains or blinds are not required to be installed.

Hereinafter, as shown in FIG. 4, a process of discharging the beads 5 to the reservoir 30 is described in a state where the beads 5 are filled in the chamber 13 of the double glazing 10.

Figure 5:
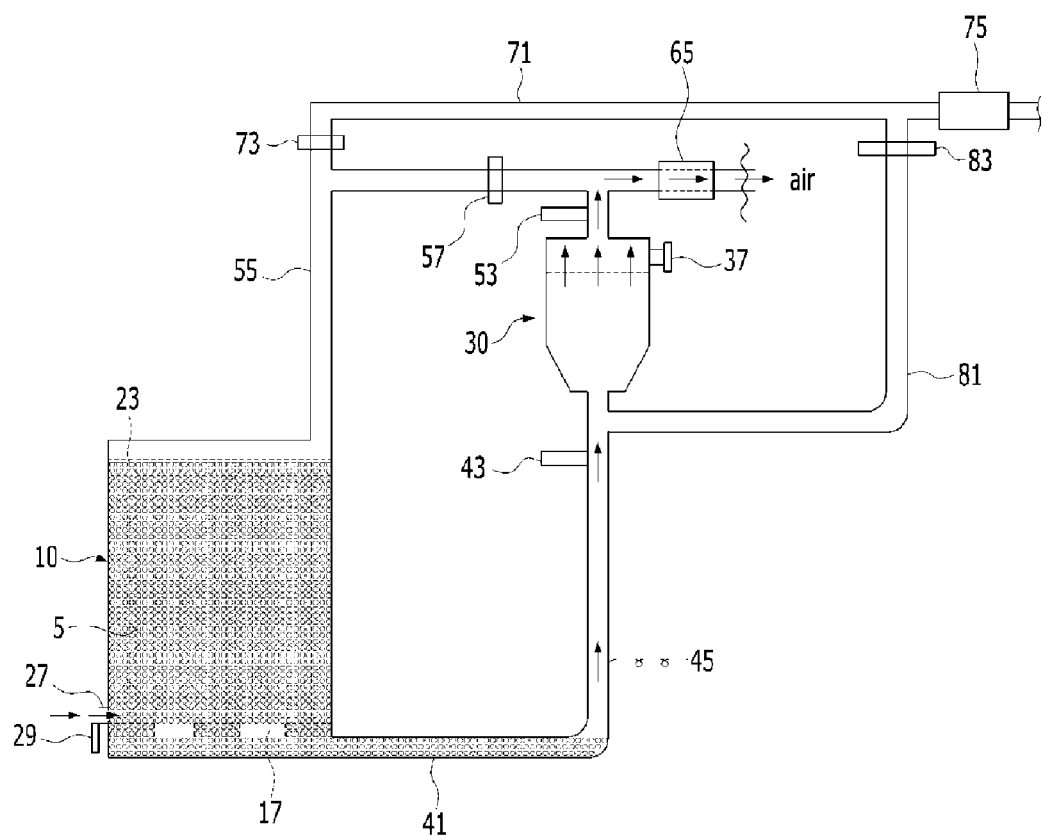
FIG. 5 is a view illustrating a process of discharging a plurality of beads from a double glazing of the double glazing insulation system of FIG. 1.

As shown in FIG. 5, the main blower 65 is operated in a state where the first and second valves 43 and 53 are opened and the third valve 57 is closed.

As the main blower 65 is operated, the main blower 65 sucks air existing in the communication pipe 61, the air discharge pipe 51, the reservoir 30, the bead flow pipe 41, and the chamber 13. In this case, since the third valve 57 is closed, the air in the chamber 13 is not sucked into the main blower 65 through the air flow pipe 55.

A negative pressure is generated in the communication pipe 61, the air discharge pipe 51, the reservoir 30, the bead flow pipe 41, and the chamber 13 by the suction operation of the main blower 65, so that the beads 5 filled in the chamber 13 flow along the bead flow pipe 41 and flow into the reservoir 30 through the bead entrance 15 of the chamber 13.

Meanwhile, before or during the flowing of the beads 5 into the chamber 13, the chamber air inlet pipe valve 29 provided in the chamber air inlet pipe 27 is opened, such that the external air having a relatively higher pressure than the chamber 13 is provided to the chamber 13, thereby smoothly discharging the beads 5 filled in the chamber 13 from the chamber 13 without bridging.

After discharging the beads 5 from the chamber 13, some beads 5 are attached to the surface of the glass window 11 by electrostatic force and remain in the chamber 13.

Figure 6:
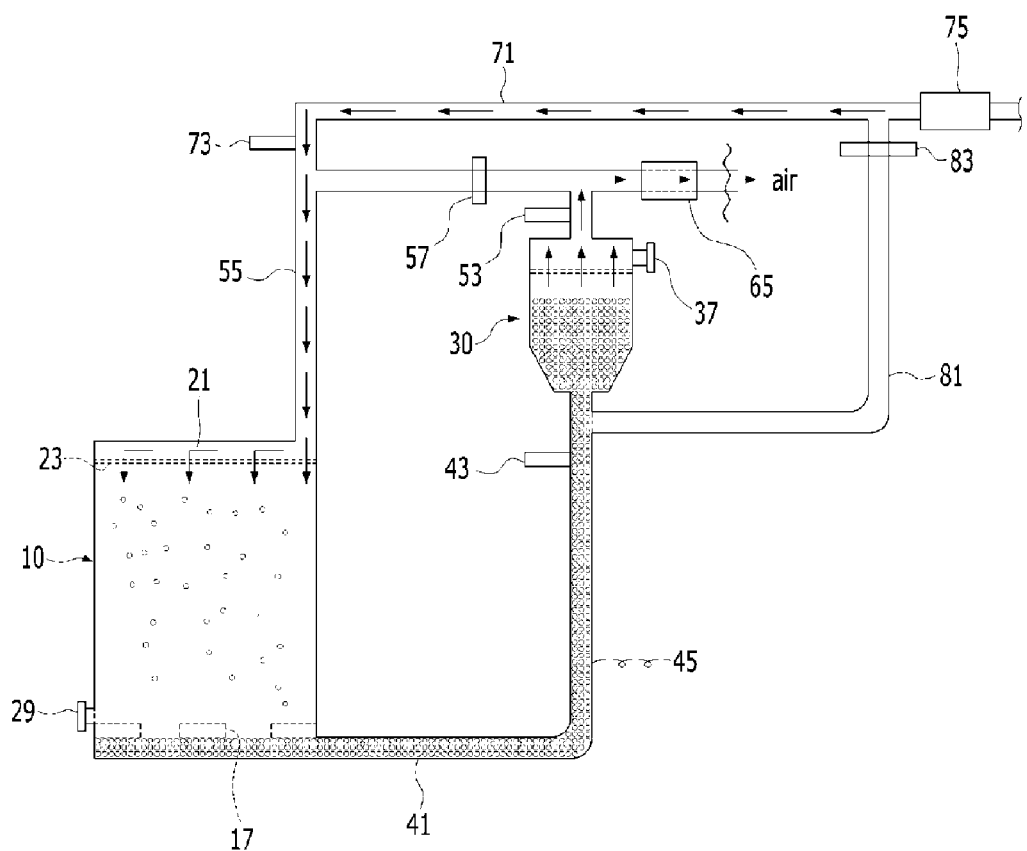
FIG. 6 is a view illustrating a process of cleaning a double glazing of the double glazing insulation system of FIG. 4.

As shown in FIG. 6, during the discharge of the beads 5 from the chamber 13, the branch pipe valve 73 provided in the branch pipe 71 is opened and the auxiliary blower 75 is additionally operated. In this case, a state in which the chamber air inlet pipe valve 29 provided in the chamber air inlet pipe 27 is closed or a state in which the chamber inlet pipe valve 29 is opened is selected according to a situation.

As the auxiliary blower 75 is operated, the auxiliary blower 75 blows air toward the branch pipe 71, and the air blown to the branch pipe 71 passes through each air hole 25 of the bead blocking member 23 via the air flow pipe 55 to flow into the chamber 13 along the surface of the glass window 11, so that the residual beads 5 attached to the surface of each glass window 11 by the electrostatic force are removed and the air flows into the bead flow pipe 41 through the bead entrance 15 together with thee residual beads 5. Thus, it is possible to minimize the amount of beads 5 attached to the surface of the glass window 11 of the double glazing 10, so that the glass window 11 may be kept clean.

Since the auxiliary air flow pipe valve 83 provided in the auxiliary air flow pipe 81 is closed when the auxiliary blower 75 is operated, the air blown from the auxiliary blower 75 does not flow into the bead flow pipe 41 through the auxiliary air flow pipe 81.

Meanwhile, the beads 5 discharged from the chamber 13 and stored in the reservoir 30 are prevented from flowing out to the air discharge pipe 51 by the auxiliary blocking member 31 provided in the reservoir 30.

In addition, the air introduced into the reservoir 30 together with the beads 5 passes through the auxiliary blocking member 31 and discharged to an outside through the main blower 65 via the air discharge pipe 51 and the communication pipe 61.

After the beads 5 discharged from the chamber 13 are stored in the reservoir 30, the first and second valves 43 and 53, which were opened as shown in FIG. 1, are closed and at the same time, the branch pipe valve 73 is closed.

By stopping the operation of the main blower 65, the chamber 13 of the double glazing 10 is in a state in which the beads 5 are discharged, so that it may be possible to view through the double glazing 10.

Figure 9:
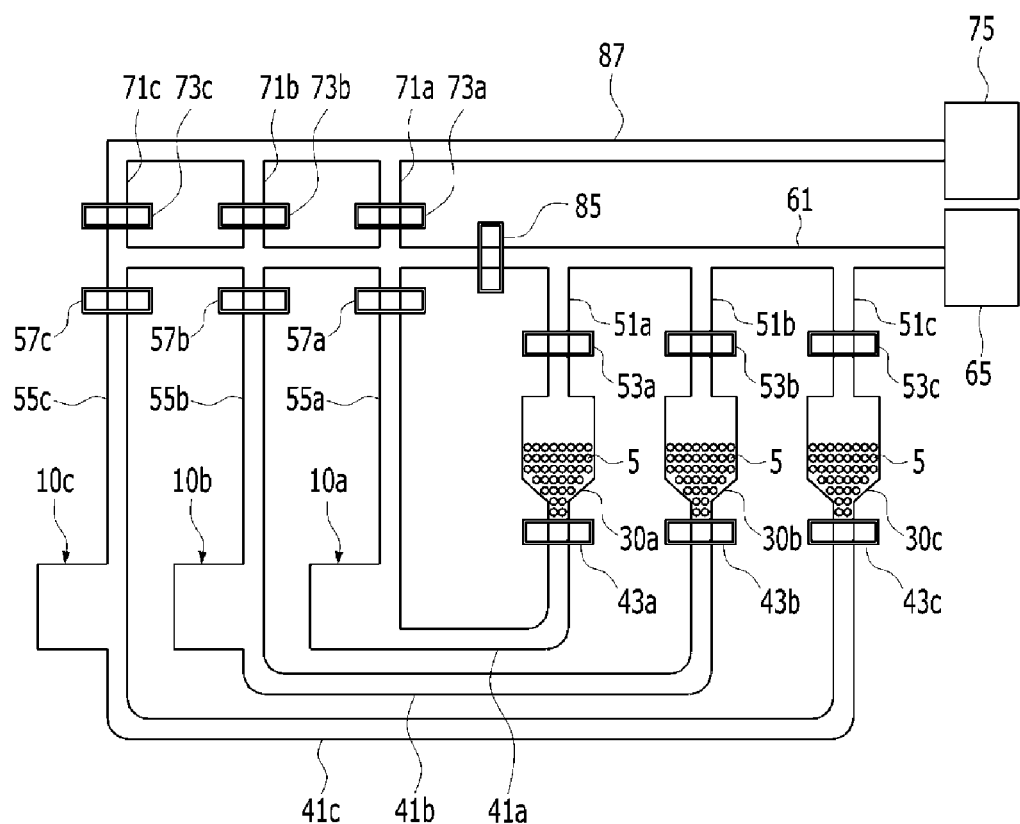
FIG. 9 is a view illustrating a state in which a double glazing insulation system according to an embodiment of the inventive concept is applied to a plurality of double glazings.

FIG. 9 is a view illustrating a configuration in which the double glazing insulation system according to the inventive concept is applied to a plurality of double glazings 10a, 10b and 10c.

As shown in FIG. 9, three double glazings 10a, 10b, and 10c are provided, but the number of double glazings is not limited thereto.

Reservoirs 30a, 30b and 30c are arranged corresponding to the number of the double glazings 10a, 10b and 10c, and the double glazings 10a, 10b and 10c and the reservoirs 30a, 30b and 30c are connected by bead flow pipes 41a, 41b, and 41c, respectively. The bead flow pipes 41a, 41b and 41c are provided with first valves 43a, 43b and 43c for interrupting the flow of the bead 5 flowing along the bead flow pipes 41a, 41b and 41c.

In addition, each of reservoirs 30a, 30b, and 30c is connected to an air discharge pipe 51 and double glazings 10a, 10b and 10c are connected to air flow pipes 55a, 55b and 55c respectively. The air discharge pipe 51 and the air flow pipes 55a, 55b and 55c are connected by one communication pipe 61. The air discharge pipes 51 are provided with second valves 53a, 53b and 53c for interrupting the flow of air flowing along the air discharge pipe 51. The air flow pipes 55a, 55b and 55c are provided with third valves 57a, 57b and 57c for interrupting the flow of air flowing along the air flow pipes 55a, 55b, and 55c.

One main blower 65 is provided in the communication pipe 61 and the communication pipe 61 is provided with a backflow prevention valve 85 that prevents the air, which is blown into the chamber from communication pipe 61 through the air flow pipes 55a, 55b and 55c by the operation of the main blower 65, from flowing backward to the communication pipe 61.

In addition, branch pipes 71a, 71b and 71c are connected to the air flow pipes 55a, 55b and 55c, respectively, and the branched pipes 71a, 71b and 71c are connected to the branch pipe values 73a, 73b, and 73c which interrupt flows of air flowing along the branch pipes 71a, 71b and 71c, respectively. The branch pipes 71a, 71b and 71c are connected to one integrated branch pipe 87 and one auxiliary blower 75 is provided in the integrated branch pipe 87.

With this configuration, as described above with respect to the above-described one double glazing insulation system, in a state where the beads 5 are stored in each of reservoirs 30a, 30b and 30c, when the beads 5 are filled in the chamber to insulate a desired double glazing 10a, 10b or 10c, the main blower 65 is operated in a state where the first valves 43a, 43b and 43c and the third valves 57a, 57b and 57c corresponding to the desired double glazing 10a, 10b and 10c are opened and the second valves 53a, 53b and 53c are closed.

By the operation of the main blower 65, the main blower 65 sucks air existing in the communication pipe 61, the air flow pipes 55a, 55b and 55c corresponding to the desired double glazing 10a, 10b and 10c, the chamber, and the bead flow pipes 41a, 41b and 41c, and allows the beads 5 stored in the reservoirs 30a, 30b and 30c corresponding to the desired double glazing 10a, 10b and 10c to flow into the chamber through the bead entrance 15 of the double glazing 10a, 10b and 10c, thereby filling the chamber with the beads 5.

Thus, the chamber of the desired double glazing 10a, 10b, and 10c is filled with the beads 5 so that heat insulation, shade and soundproofing are improved due to the double glazing 10a, 10b and 10c and additional curtains or blinds are not required to be installed.

In addition, as described in the one double glazing insulation system, in the state where the beads 5 are filled in the chambers of each double glazing 10a, 10b and 10c, when the beads 5 are discharged from the chamber to view through the desired double glazing 10a, 10b and 10c, the main blower 65 is operated in a state where the first valves 43a, 43b, and 43c and the second valves 53a, 53b, and 53c corresponding to the desired double glazing 10a, 10b, and 10c, are opened and the third valves 57a, 57b and 57c are closed.

As the main blower 65 is operated, the main blower 65 sucks the air existing in the communication pipe 61, the air discharge pipe 51 corresponding to the desired double glazing 10a, 10b and 10c, the reservoirs 30a, 30b and 30c, the bead flow pipes 41a, 41b and 41c, and the chamber, and the beads 5, which are filled in the chamber corresponding to the desired double glazing 10a, 10b and 10c, flow into and are stored in the reservoirs 30a, 30b and 30c through the bead flow pipes 41a, 41b and 41c.

Then, the branch pipe valves 73a, 73b and 73c corresponding to the desired double glazing 10a, 10b and 10c are opened and the auxiliary blower 75 is additionally operated to remove the residual beads 5 attached to the glass window surface by the electrostatic force, so that the residual beads 5 flow into and are stored in the reservoirs 30a, 30b and 30c through the bead flow pipes 41a, 41b and 41c.

Thus, the glass window of the desired double glazing 10a, 10b and 10c may be kept clean and may view an outside through the double glazings 10a, 10b, and 10c.

Accordingly, the chambers of the double glazings 10a, 10b and 10c are filled with the beads 5 simultaneously or selectively to insulate the double glazings 10a, 10b and 10c. Alternatively, the beads 5 may be discharged from the chambers of the double glazings 10a, 10b and 10c simultaneously or selectively, thereby viewing an outside through the double glazings.

In addition, the double glazing insulation system according to an embodiment of the inventive concept may be applied to not only one double glazing but also a plurality of double glazings.

Figure 10:
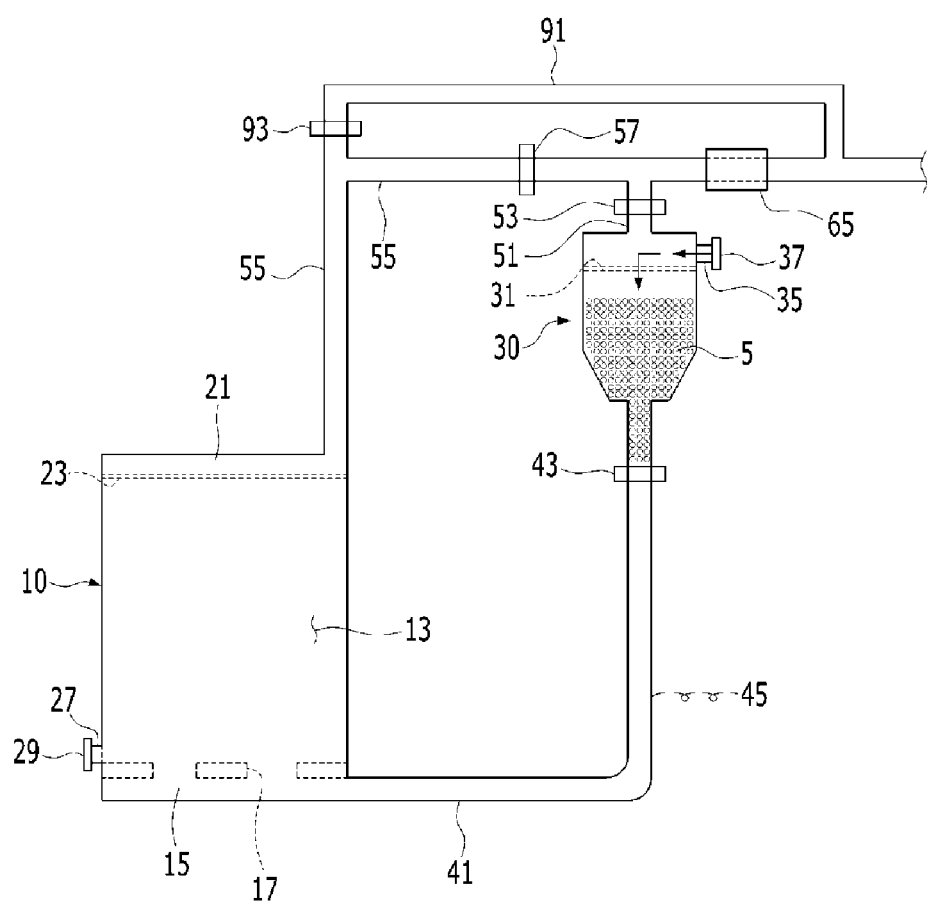
FIG. 10 is a view illustrating a double glazing insulation system according to another embodiment of the inventive concept.

FIG. 10 is a view illustrating a configuration of a double glazing insulation system according to another embodiment of the inventive concept.

Unlike the above-described embodiment, the double glazing insulation system according to another embodiment of the present invention does not include a branch pipe, a branch pipe valve, an auxiliary blower, an auxiliary air flow pipe, and an auxiliary air flow pipe valve, but instead includes a bypass pipe 91 and a bypass pipe valve 93.

The bypass pipe 91 has a hollow pipe or duct shape. The bypass pipe 91 connects the communication pipe 61 and the air flow pipe 55 and guides a part of the air discharged through the communication pipe 61 via the main blower 65 a lower end of the branch pipe 71, the bead flow pipe 41 or the reservoir 30 to flow into the air flow pipe 55.

The bypass pipe valve 93 is provided in the bypass pipe 91 to open and close the bypass pipe 91. It is possible to control the flow of air flowing into the air flow pipe 55 along the bypass pipe 91 by an opening or closing operation of the bypass pipe valve 93.

Thus, when the bypass pipe valve 93 provided in the bypass pipe 91 is opened during the discharge of the beads 5 from the chamber 13, a part of the air discharged through the communication pipe 61 via the main blower 65 sequentially flows through each air hole 25 of the bead blocking member 23, the bypass pipe 91 and the air flow pipe 55, and flows into the chamber 13 along the surface of the glass window 11. Thus, the residual beads 5 attached to the surfaces of each glass window 11 by the electrostatic force are removed, and the air flows into the bead flow pipe 41 through the bead entrance 15 together with the remaining beads 5, so that the air flows into the reservoir 30. Accordingly, the amount of the beads 5 attached to the surface of the glass window 11 of the double glazing 10 may be minimized, and the glass window may be kept clean.

As described above, the bypass pipe 91 and the bypass pipe valve 93 are provided instead of the branch pipe, the branch pipe valve, the auxiliary blower, the auxiliary air flow pipe, and the auxiliary air flow pipe valve, so that the structure of the double glazing insulation system may be simplified, thereby reducing the cost. In addition, the beads 5 are filled in the chamber 13 of the double glazing 10 to insulate, shade and soundproof the double glazing 10 or to discharge the beads 5 from the chamber 13 of the double glazing 10, so that it is possible to view through the double glazing 10.

Figure 11:
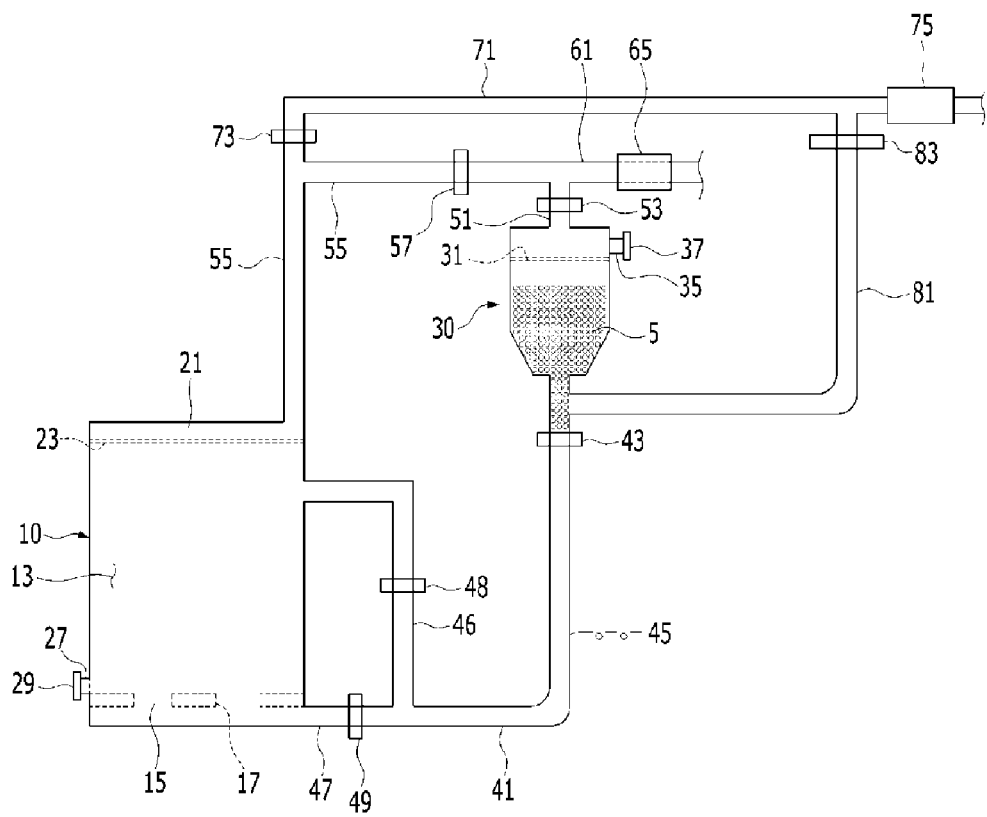
FIG. 11 is a view illustrating a double glazing insulation system according to still another embodiment of the inventive concept.

FIG. 11 is a view illustrating a configuration of a double glazing insulation system according to still another embodiment of the inventive concept.

As shown in the drawings, unlike the above-described embodiments, a double glazing insulation system according to still another embodiment of the inventive concept includes a bead supply pipe 46 and a bead discharge pipe 47 between the chamber 13 and the bead flow pipe 41.

The bead supply pipe 46 is branched from the bead flow pipe 41 and communicates with the upper region of the chamber 13 to supply the beads 5 to the chamber 13. The bead supply pipe 46 has a hollow pipe or duct shape. The bead supply pipe 46 serves to guide the beads 5 supplied from the bead flow pipe 41 to be filled into the upper region of the chamber 13.

The bead supply pipe 46 is provided with a bead supply pipe valve 48 for opening and closing the bead supply pipe 46. It is possible to control the flow of the beads 5 filled into the chamber 13 through the bead supply pipe 46 by the opening and closing operation of the bead supply pipe valve 48.

The bead discharge pipe 47 is branched from the bead flow pipe 41 and communicates with a lower area of the chamber 13, for example, the bead entrance 15 to discharge the beads 5 filled in the chamber 13. The bead discharge pipe 47 has a hollow pipe or duct shape. The bead discharge pipe 47 serves to guide the beads 5 discharged from the chamber 13 to be discharged into the bead flow pipe 41.

The bead discharge pipe 47 is provided with a bead discharge pipe valve 49 for opening and closing the bead discharge pipe 47. It is possible to control the flow of the beads 5 discharged to the bead flow pipe 41 through the bead discharge pipe 47 by the opening and closing operation of the bead discharge pipe valve 49.

According to the above-described configuration, when the beads 5 are filled into the chamber 13, in a state where the bead supply pipe valve 48 is opened and at the same time, the bead discharge pipe valve 49 is closed, the beads 5 stored in the reservoir 30 may be filled into the chamber 13 through the bead flow pipe 41 and the bead supply pipe 46.

Meanwhile, when the beads 5 are discharged from the chamber 13, in a state where the bead supply pipe valve 48 is closed and at the same time, the bead discharge pipe valve 49 is opened, the beads 5 stored in the chamber 30 may be stored in the reservoir 30 through the bead entrance 15, the bead discharge pipe 47 and the bead flow pipe 41.

Therefore, the beads 5 are filled into the upper region of the chamber 13 when filled in the chamber 13, thereby minimizing the generation of static electricity between the beads 5 in the chamber 13.

While the inventive concept has been described with reference to embodiments, it will be apparent to those skilled in the art that various changes and modifications may be made without departing from the spirit and scope of the inventive concept. Therefore, it should be understood that the above embodiments are not limiting, but illustrative.

What is claimed is:

1. A double glazing insulation apparatus, comprising:
   a double glazing including a chamber formed between a pair of glass windows, a bead entrance through which a plurality of beads and air enter and exit from the chamber, and an air entrance through which air enters and exits from the chamber;
   a reservoir for storing the plurality of beads;
   a bead flow pipe for connecting the reservoir and the bead entrance, and configured to guide a flow of the plurality of beads, wherein the plurality of beads are configured to flow from the reservoir to the chamber, to be filled in the chamber, and the plurality of beads are also configured to flow from the chamber to the reservoir, to be discharged from the chamber;
   an air discharge pipe connected to the reservoir to guide a flow of air discharged from the reservoir;
   an air flow pipe connected to the air entrance to guide a flow of air entering and exiting from the air entrance;
   a communication pipe for allowing the air flow pipe to communicate with the air discharge pipe; and
   a main blower provided in the communication pipe, wherein the main blower is configured to suck air in the chamber through the air flow pipe to flow the plurality of beads from the reservoir to the chamber, and the main blower is also configured to suck the air in the chamber through the bead flow pipe, the reservoir, and the air discharge pipe to discharge the plurality of beads from the chamber into the reservoir.

2. The double glazing insulation apparatus of claim 1, further comprising:
   a branch pipe branched from the air flow pipe to guide a flow of air;
   a branch pipe valve provided in the branch pipe to open or close the branch pipe; and
   an auxiliary blower provided in the branch pipe to pressurize and blow air into the chamber through the branch pipe and the air flow pipe.

3. The double glazing insulation apparatus of claim 1 further comprising:
   a bypass pipe for connecting the communication pipe and the air flow pipe to guide a part of air discharged through the communication pipe via the main blower to flow into the air flow pipe;
   a bypass pipe valve provided in the bypass pipe to open or close the bypass pipe.

4. The double glazing insulation apparatus of claim 1, further comprising:
   a first valve provided in the bead flow pipe to open or close the bead flow pipe;
   a second valve provided in the air discharge pipe to open or close the air discharge pipe; and
   a third valve provided in the air flow pipe to open or close the air flow pipe,
   wherein the first and third valves are opened and the second valve is closed when the plurality of beads are filled in the chamber, and the first and second valves are opened and the third valve is closed when the plurality of beads are discharged from the chamber.

5. The double glazing insulation apparatus of claim 2, further comprising:
   an auxiliary air flow pipe connected to the branch pipe and the bead flow pipe or a lower end of the reservoir to guide the air blown from the auxiliary blower to flow to the bead flow pipe or the lower end of the reservoir; and
   an auxiliary air flow pipe valve provided in the auxiliary air flow pipe to open or close the auxiliary air flow pipe.

6. The double glazing insulation apparatus of claim 1, further comprising:
   a bead passage member provided in the bead entrance to guide the plurality of beads and air to flow into or out from the chamber without any bottleneck.

7. The double glazing insulation apparatus of claim 1, further comprising:
   a bead blocking member provided in the air entrance and formed with at least one air hole through which the air flows to prevent the plurality of beads from flowing into the air flow pipe.

8. The double glazing insulation apparatus of claim 1, further comprising:

an auxiliary blocking member provided in the reservoir to prevent the plurality of beads introduced into the reservoir from flowing out to the air discharge pipe.

9. The double glazing insulation apparatus of claim 8, further comprising:
- a reservoir air inlet pipe provided in the reservoir between the auxiliary blocking member and the air discharge pipe to guide a flow of air introduced into the reservoir; and
- a reservoir air inlet pipe valve provided in the reservoir air inlet pipe to open or close the reservoir air inlet pipe.

10. The double glazing insulation apparatus of claim 1, further comprising:
- a chamber air inlet pipe provided in the double glazing to communicate with the chamber and allow air to flow into the chamber; and
- a chamber air inlet pipe valve provided in the chamber air inlet pipe to open or close the chamber air inlet pipe.

11. The double glazing insulation apparatus of claim 1, further comprising:
- an antistatic member grounded to the bead flow pipe to prevent static electricity from being generated between the plurality of beads flowing through the bead flow pipe.

12. The double glazing insulation apparatus of claim 1, further comprising:
- a bead supply pipe branched from the bead flow pipe and communicating with an upper region of the chamber to supply the plurality of beads to the chamber;
- a bead discharge pipe branched from the bead flow pipe and communicating with the bead entrance to discharge the plurality of beads filled in the chamber;
- a bead supply pipe valve provided in the bead supply pipe to open or close the bead supply pipe; and
- a bead discharge pipe valve provided in the bead discharge pipe to open or close the bead discharge pipe,
- wherein, when the plurality of beads are filled in the chamber, the plurality of beads stored in the reservoir are filled into the chamber through the bead flow pipe and the bead supply pipe, and
- wherein, when the plurality of beads are discharged from the chamber, the plurality of beads stored in the chamber are stored in the reservoir through the bead discharge pipe and the bead flow pipe via the bead entrance.

* * * * *